(12) United States Patent
Larson

(10) Patent No.: US 9,212,672 B2
(45) Date of Patent: Dec. 15, 2015

(54) HYDRAULIC SYSTEM DE-AERATION DEVICE

(75) Inventor: Eric William Larson, Richland, MI (US)

(73) Assignee: Parker-Hannifin Corporation, Cleveland, OH (US)

( * ) Notice: Subject to any disclaimer, the term of this patent is extended or adjusted under 35 U.S.C. 154(b) by 112 days.

(21) Appl. No.: 14/119,521

(22) PCT Filed: Sep. 1, 2011

(86) PCT No.: PCT/US2011/050151
§ 371 (c)(1),
(2), (4) Date: Nov. 22, 2013

(87) PCT Pub. No.: WO2012/161721
PCT Pub. Date: Nov. 29, 2012

(65) Prior Publication Data
US 2014/0083290 A1   Mar. 27, 2014

Related U.S. Application Data

(60) Provisional application No. 61/489,313, filed on May 24, 2011.

(51) Int. Cl.
 *B01D 19/00* (2006.01)
 *F15B 21/04* (2006.01)
(52) U.S. Cl.
 CPC .......... *F15B 21/044* (2013.01); *B01D 19/0036* (2013.01); *B01D 19/0063* (2013.01); *F15B 2211/611* (2013.01); *F15B 2211/63* (2013.01); *F15B 2211/655* (2013.01); *F15B 2211/85* (2013.01)

(58) Field of Classification Search
 CPC ........................... B01D 19/00; B01D 19/0078
 USPC ............. 95/237, 254, 261, 266, 341; 96/195; 55/306; 60/39.092
 See application file for complete search history.

(56) References Cited

U.S. PATENT DOCUMENTS 3,273,313 A   9/1966   Livesey et al.
3,303,895 A   2/1967   Fontenot (Continued)

FOREIGN PATENT DOCUMENTS

CN   101379303 A   3/2009
DE   19913969   10/2000

(Continued)

OTHER PUBLICATIONS

Office Action with translation for corresponding Chinese Application No. 201180071141.7 issued Mar. 20, 2015.

(Continued)

*Primary Examiner* — Duane Smith
*Assistant Examiner* — Minh-Chau Pham
(74) *Attorney, Agent, or Firm* — Renner, Otto, Boisselle & Sklar, LLP

(57) ABSTRACT

A de-aeration device that de-aerates hydraulic fluid in a hydraulic system. The hydraulic fluid is controllably supplied to the de-aeration device in response to one or more sensed parameters. Consequently, the de-aeration device can de-aerate fluid at strategic times during operation of the hydraulic system to prevent a decrease in system performance and prevent cavitation.

20 Claims, 2 Drawing Sheets

(56) References Cited

U.S. PATENT DOCUMENTS

| | | | | |
|---|---|---|---|---|
| 3,358,425 | A | * | 12/1967 | Burnham, Sr. .................. 96/195 |
| 3,778,969 | A | * | 12/1973 | Sudduth .......................... 95/237 |
| 3,895,927 | A | * | 7/1975 | Bournham, Sr. ................ 96/163 |
| 3,973,930 | A | * | 8/1976 | Burgess .......................... 95/261 |
| 4,300,919 | A | | 11/1981 | Lewis et al. |
| 4,345,920 | A | * | 8/1982 | Ross ............................... 95/254 |
| 4,422,476 | A | * | 12/1983 | Blanchard ..................... 137/810 |
| 4,585,465 | A | * | 4/1986 | Suzuki et al. ................... 95/261 |
| 4,612,021 | A | * | 9/1986 | Bland et al. ..................... 95/265 |
| 4,657,565 | A | * | 4/1987 | Siekmann et al. .............. 95/266 |
| 5,032,260 | A | * | 7/1991 | Alzner ........................... 210/137 |
| 5,064,449 | A | | 11/1991 | Ford et al. |
| 5,314,613 | A | * | 5/1994 | Russo ............................ 208/184 |
| 5,727,390 | A | | 3/1998 | Hartle |
| 5,749,945 | A | | 5/1998 | Beck |
| 6,120,254 | A | * | 9/2000 | Popov ............................ 417/151 |
| 6,139,606 | A | * | 10/2000 | Forslund et al. ................ 95/241 |
| 6,447,579 | B1 | * | 9/2002 | Pannenborg .................... 95/247 |
| 2010/0101423 | A1 | | 4/2010 | Ingvast et al. |
| 2010/0219289 | A1 | | 9/2010 | Vieules |
| 2010/0319791 | A1 | | 12/2010 | Dirkin et al. |

FOREIGN PATENT DOCUMENTS

| | | |
|---|---|---|
| DE | 10117619 | 3/2002 |
| EP | 0307965 | 3/1989 |
| EP | 0420503 | 4/1991 |

OTHER PUBLICATIONS

International Preliminary Report on Patentability for corresponding Patent Application No. PCT/US2011/050151 dated Jul. 30, 2013.
International Search Report for corresponding Patent Application No. PCT/US2011/050151 dated Apr. 12, 2012.

* cited by examiner

HYDRAULIC SYSTEM DE-AERATION DEVICE

RELATED APPLICATIONS

This application is a national phase of International Application No. PCT/US2011/050151 filed Sep. 1, 2011 and published in the English language, which claims the benefit of U.S. Provisional Application No. 61/489,313 filed May 24, 2011, which is hereby incorporated herein by reference.

FIELD OF INVENTION

The present invention relates generally to hydraulic systems, and more particularly to a de-aeration device for a hydraulic system.

BACKGROUND

Minimizing air in hydraulic systems is advantageous to maintain optimum performance in the system. Hydraulic fluids typically used in hydraulic systems are capable of holding up to 12% of air by volume at standard atmospheric conditions. The air in the hydraulic systems exists in two forms, as free air and as dissolved air. Dissolved air, as a percent of total fluid volume, is proportional to the pressure maintained on the fluid. When pressure in the hydraulic systems is reduced, for example below its saturation pressure, the dissolved air is released from the hydraulic fluid as free air. Free air is problematic in hydraulic systems because free air can decrease system performance by reducing the overall stiffness of the hydraulic system and can lead to cavitation.

To reduce the amount of free air in the hydraulic fluid, the hydraulic fluid can be retained in a reservoir allowing the free air to rise and escape to atmosphere. To reduce the amount of dissolved air in the hydraulic fluid, a system can be depressurized and the dissolved air manually bled out. Alternatively, the hydraulic fluid can be run through an unpressurized, vented reservoir, that may be located in a service cart for aircraft applications.

SUMMARY OF INVENTION

The present invention provides a de-aeration device that de-aerates hydraulic fluid in a hydraulic system. The hydraulic fluid is controllably supplied to the de-aeration device in response to one or more sensed parameters. Consequently, the de-aeration device can de-aerate fluid at strategic times during operation of the hydraulic system to prevent a decrease in system performance and to prevent cavitation.

In particular, a hydraulic system is provided that includes a high pressure supply line for supplying high pressure hydraulic fluid to a hydraulic component, a de-aeration device that removes air from the hydraulic fluid, a control valve for controllably supplying the high pressure hydraulic fluid from the high pressure supply line to the de-aeration device, and a controller for controlling the control valve such that the high pressure hydraulic fluid from the supply line is supplied to the de-aeration device in response to one or more sensed parameters. The sensed parameters may be one or more parameters of the hydraulic system or equipment including the hydraulic system, in particular an aircraft.

According to another aspect of the invention, a de-aeration device is provided that includes a jet pump configured to receive fluid, in particular hydraulic fluid, to be de-aerated, a suction chamber in fluidic communication with the jet pump, wherein fluid flowing through the jet pump generates a relatively low pressure in the suction chamber, a return chamber for receiving the fluid exiting the jet pump, wherein the return chamber receives a mixture of high pressure fluid flowing through the jet pump from the control valve and low pressure fluid drawn into the jet pump from the suction chamber, and a de-aeration chamber having a first end coupled to the return chamber and a second end coupled to suction chamber, wherein the de-aeration chamber is configured to receive at least a portion of the mixture of fluid from the return chamber, separate air from the mixture of fluid, and deliver the de-aerated fluid to the suction chamber.

The jet pump may include a nozzle and a diffuser downstream of the nozzle, wherein the nozzle produces a high pressure stream of fluid that is delivered to an inlet of the diffuser.

The de-aeration device may be in combination with a bleed valve, wherein the bleed valve is configured to sense the presence of the gas in de-aeration chamber and release the gas from the de-aeration device.

The de-aeration device may be in combination with a control valve, wherein the control valve controllably supplies the high pressure hydraulic fluid from a high pressure supply line to the de-aeration device.

The de-aeration device may be in combination with a controller for controlling the control valve such that the high pressure hydraulic fluid from the supply line is supplied to the de-aeration device in response to one or more sensed parameters, in particular one or more parameters of a hydraulic system including the device, or equipment including the device, such as an aircraft.

According to another aspect of the invention, a method of de-aerating hydraulic fluid flowing through one or more high pressure supply lines to one or more hydraulic components is provided, the supply lines being configured to supply a relatively high volume of hydraulic fluid to the one or more hydraulic components. The method includes controllably delivering at least a portion of the high pressure fluid from the supply line to a de-aeration device such that a relatively low volume of high pressure fluid is controllably supplied to the de-aeration device, de-aerating the fluid in the de-aeration device in response to one or more sensed parameters, and expelling gas that has been de-aerated from the fluid from the de-aeration device. Again, the sensed parameter or parameters may be in particular one or more parameters of a hydraulic system including the device, or equipment including the device, such as an aircraft.

The foregoing and other features of the invention are hereinafter described in greater detail with reference to the accompanying drawings.

DETAILED DESCRIPTION

The principles of the present invention have particular application to hydraulic systems on aircrafts and thus will be described below chiefly in this context. It will of course be appreciated, and also understood, that the principles of the invention may be useful in other applications including, in particular, other vehicles having hydraulic systems, such as construction equipment and tanks, and more general to applications where air (or another gas) is separated from a fluid. Unless otherwise indicated, the term "air" is used herein to denote air or any other gas that is intended to be removed from a fluid, such as hydraulic fluid. In addition, the term "de-aeration" and derivatives thereof is intended to encompass the removal of air or any other gas from a fluid unless otherwise indicated. In the context of preferred embodiments of the present invention relating to hydraulic systems, the gas to be removed from the hydraulic fluid would normally be understood to be air.

Figure 1:
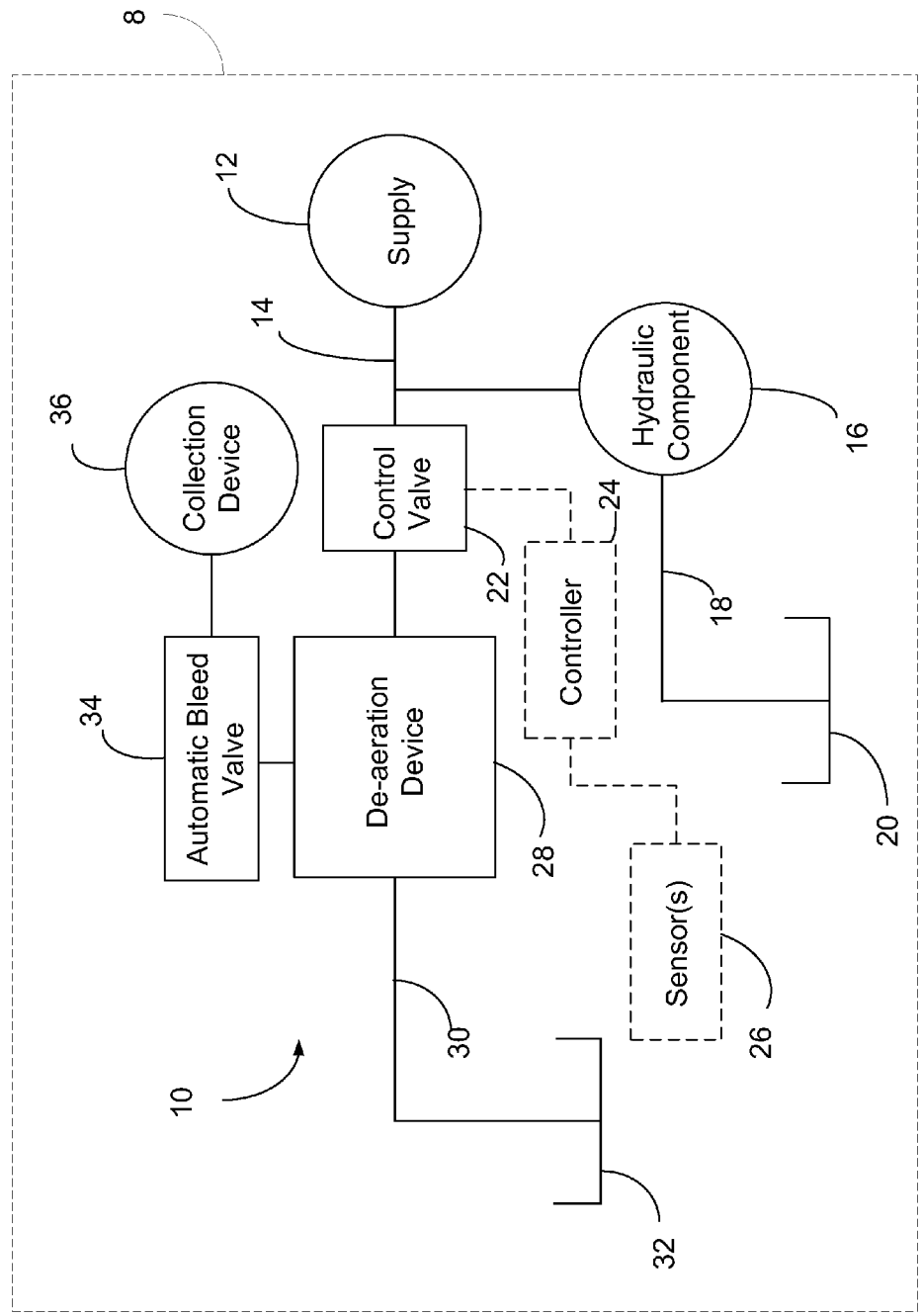
FIG. 1 is a schematic illustration a hydraulic system for equipment including an exemplary de-aeration device according to the invention.

Referring now in detail to the drawings and initially to FIG. 1, a hydraulic system 10 can be used in various types of equipment 8, such as an aircraft. The hydraulic system includes a supply 12 of hydraulic fluid, such as high pressure hydraulic fluid, coupled to a supply line 14. During operation of the hydraulic system, the supply line 14 delivers the hydraulic fluid under high pressure to one or more hydraulic components 16, which may be any hydraulic component in the aircraft, such as an actuator for the flaps. When the hydraulic fluid exits the hydraulic component 16, the fluid flows to a return line 18, which delivers the fluid to a reservoir 20 and/or back to the supply 12 for re-pressurization. The supply 12 typically will include a pump of any suitable type for providing to the supply line or lines 14 high pressure hydraulic fluid for powering one or more hydraulic actuators such as piston-cylinder assemblies, hydraulic motors, etc. In aircraft hydraulic systems, high pressure hydraulic fluid at pressures up to 5000 PSI is supplied at flow rates tailored to meet specific hydraulic system requirements.

The supply line 14 can also deliver hydraulic fluid to a de-aeration device 28 via a control valve 22, such as a solenoid valve. When the control valve is activated, a portion of the fluid flowing in the supply line 14 is shunted from the supply line and delivered to the de-aeration device 28. If the hydraulic component(s) 16 is/are in use, the balance of the flow, which amounts to a majority of the flow, is or can be delivered to the hydraulic component(s) 16. Because of the relatively small amount of fluid shunted from the supply line 14, the hydraulic system will be able to operate normally for the most part even when the control valve 22 is activated. When the control valve 22 is de-activated, no fluid flows to the de-aeration device, thus, all of the hydraulic fluid in the supply line 14 is delivered to the hydraulic component 16.

The control valve 22 is controlled by a controller 24 as a function of one or more parameters, such as an input or inputs from one or more sensors 26. In an aircraft, one of the sensors may be, for example, a weight on wheels switch that indicates the aircraft is on the ground, and another sensor may indicate that the aircraft is not in a landing mode. The sensors could therefore indicate that the hydraulic component(s) is/are in or not in a non-critical period of use, such as during taxiing or when the plane is not moving, so that the controller can activate/open the control valve 22 during non-critical periods or de-activate/close the control valve 22 when maximum performance of the hydraulic system is desired. It will be appreciated, however, that the control valve can be activated when no hydraulic fluid is being supplied to the hydraulic component, when the aircraft is in the air, during landing, etc. Moreover, it will be appreciated that the control valve 22 can be activated manually for some applications.

The control valve 22 thus controllably supplies the high pressure hydraulic fluid from the high pressure supply line 14 to the de-aeration device 28, which is provided to de-aerate the hydraulic fluid. The control valve 22 can be coupled to the de-aeration device 28 in any suitable manner, such as by coupling to a port of the de-aeration device. More particularly, the port may be provided in a body of the de-aeration device and the control valve may be in the form of a cartridge threaded into or otherwise secured in the port of the body.

Fluid de-aerated by the de-aeration device exits the de-aeration device at a port to which a return line 30 is connected. The return line 30 in turn can be connected to a reservoir 32 or directly back to the supply 12 for re-pressurization.

Air and/or other gases that have been de-aerated from the fluid exit the de-aeration device 28 via a valve 34, such as a manual or an automatic bleed valve, to a collection device 36, such as an ecology bottle, or alternatively vents the air to atmosphere. The automatic bleed valve may be any suitable bleed valve, such as the valve disclosed in U.S. patent applicant Ser. No. 12/867,581, which is hereby incorporated herein by reference. The bleed valve may be activated when the control valve 22 is activated, for example by the controller 24, or activated independently of the control valve.

Figure 2:
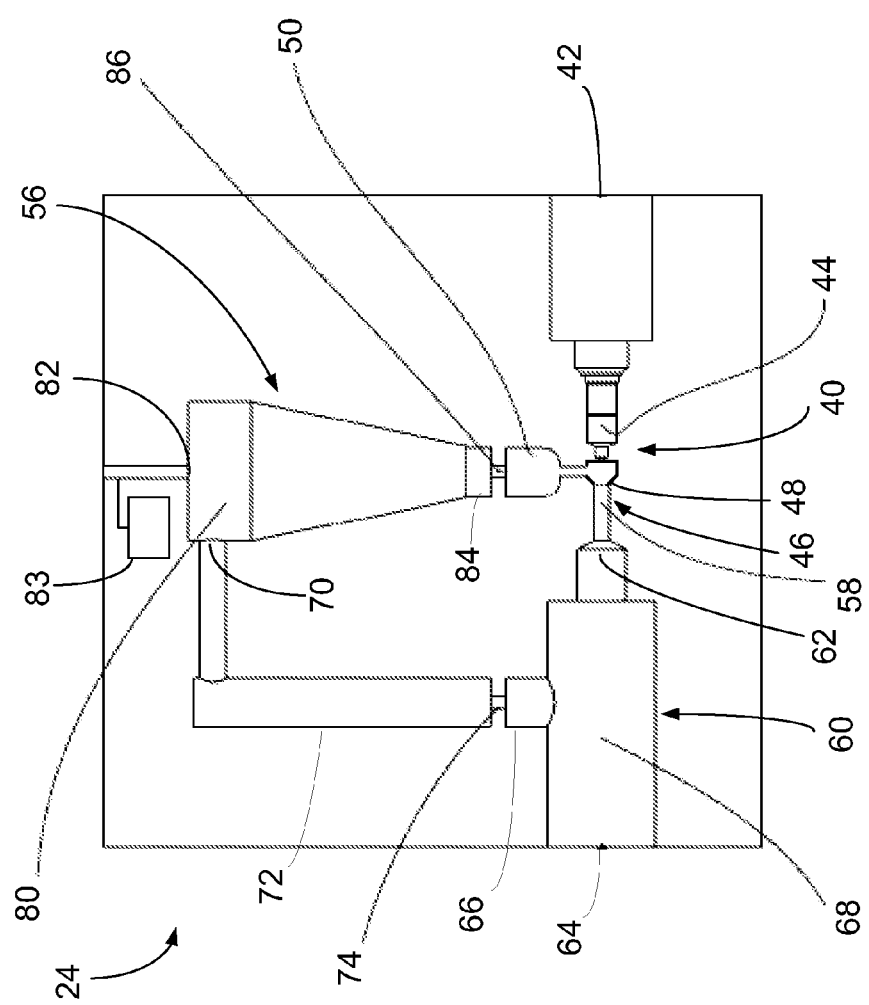
FIG. 2 is a schematic illustration of an exemplary de-aeration device according to the invention.

Turning now to FIG. 2, the de-aeration device 28 is shown in more detail. The de-aeration device may be provided for use in closed hydraulic systems, for example, where fluid pressure is maintained above atmospheric conditions for extended periods of time. As noted above, the device may be controlled to operate on demand, during predetermined times, or may be operated continuously with or without a control valve and/or a controller, for example, when system pressure rises above 500 psig, 750 psig, 1000 psig or higher.

The de-aeration device 28 includes a jet pump 40, which may be any suitable jet pump, injector, eductor, or other device that uses the venturi effect of a converging-diverging nozzle to convert the pressure energy of a motive fluid to velocity energy which creates a low pressure zone that draws in and entrains a suction fluid. The jet pump includes an inlet port 42, a nozzle 44 and a diffuser 46. The jet pump 40 is coupled to the valve 22 via the port, for example the valve may be a valve cartridge received in the port. The nozzle 44 is in fluidic communication with the port to receive the fluid from the control valve 22. The nozzle 44 produces a high velocity stream of fluid that exits the nozzle into an inlet section 48 of the diffuser 46.

The interaction between the nozzle 44 and the diffuser 46 creates a low pressure in the inlet section 48 of the diffuser 46 that is in fluid communication with an outlet end of a suction chamber 50. The low pressure in the suction chamber 50 causes fluid to be drawn into an inlet end of the suction chamber from an outlet end of a de-aeration chamber 56, discussed in detail below. The fluid drawn into the suction chamber 50 will flow into the inlet section 48 of the diffuser 46 to be mixed with the high velocity stream exiting the nozzle 44. The suction chamber 50 may communicate with the inlet section 48 of the diffuser by way of an annular passage circumferentially surrounding the diffuser 48 and connected to the diffuser by a plurality of circumferentially spaced apart holes, whereby fluid drawn from the suction chamber is drawn through a plurality of the circumferentially spaced apart holes communicating with the inlet section 48.

The fluid drawn from the suction chamber 50 mixes in the diffuser 48 with the high velocity fluid from the nozzle 44 and is directed downstream to an outlet section 58 of the diffuser 46 that is in fluidic communication with a return chamber 60. As shown, the inlet section 46 of the diffuser has a diameter that gradually reduces to the diameter of the outlet section 58 of the diffuser to assist in mixing and to cause suction to draw in the fluid from the suction chamber 50.

The return chamber 60 includes an inlet section 62, a first or main outlet section (or port) 64 and a second or return outlet section 66. The inlet section 62 is connected to the outlet section 58 of the diffuser 46 to receive the mixture of fluid from the diffuser. The fluid flows into a larger crosssection main portion 68 of the return chamber from which a majority of the fluid exits via the first outlet section 64 which, in the illustrated embodiment, is connected by return line 30 (FIG. 1) to the reservoir 32 (FIG. 1). Depending on the system being de-aerated, the return chamber 60 may be maintained at a constant pressure or may have a variable pressure. The pressure in the return chamber, either constant or variable, will be greater than the pressure in the suction chamber 50 as discussed below. Therefore, because the pressure in the suction chamber 50 will be lower than the pressure in the return chamber 60, a portion of the fluid in the return chamber is shunted from the return chamber and drawn into the de-aeration chamber 56.

The fluid shunted from the return chamber 60 is drawn out of the return outlet section 66 of the return chamber, which is connected to an inlet 70 of the de-aeration chamber 56 by a passage 72. The passage 72 includes a flow restrictor 74, such as an orifice, which causes a pressure drop of the fluid below the pressure in the return chamber 60. The reduced pressure of the fluid causes the dissolved air to come out of the fluid as free air, which may be in the form of gas bubbles.

The reduced pressure fluid, along with the free air, is delivered to the inlet 70 of the de-aeration chamber 56 for flow into a cyclone portion 80 of the de-aeration chamber. The inlet 70 is disposed tangential to a wall of the de-aeration chamber at the wider end of the cyclon portion 80 that tapers from a cylindrical upper portion of the de-aeration chamber to an outlet end portion 84. The inlet 70 directs the fluid and free air tangentially into the upper region of the cyclone portion 80 so as to cause the fluid to swirl around the center axis of the cyclone portion. Because the fluid and air entering the cyclone portion 80 have a relatively high velocity and because of the funnel-shape of the cyclone portion 80, the fluid and air entering the cyclone portion 80 will begin to rotate and form a vortex inside the cyclone portion 80. Free air in the vortex will be caused to move to the center of the vortex because of its lower mass than the liquid and the liquid will flow against the wall of the cyclone portion 80 to its outlet portion 84. In the center of the vortex the relative velocity is reduced to a point that allows the free air to migrate to the top of the de-aeration chamber 56, towards an air outlet 82 coupled to the bleed valve 34 (FIG. 1).

The bleed valve 34 (FIG. 1) includes a sensor or other suitable means (schematically indicated at 83 in FIG. 2) for detecting when free air in the de-aeration chamber 56 has migrated to the upper region of the de-aeration chamber. In response to free air being detected, the bleed valve 34 will open so that the free air can flow to the collection device 36 or to the atmosphere. Pressure in the de-aeration chamber normally will be higher than atmospheric pressure. The now de-aerated fluid at the outlet end of the cyclone portion 80 will flow to the suction chamber 50 via a flow restrictor 86, such as an orifice. The flow restrictor 86 creates a pressure drop which serves to maintain the de-aeration chamber 56 at a positive pressure. The fluid then flows from the flow restrictor 86 to the suction chamber 50. The fluid in the suction chamber 50 is then drawn into the diffuser 46 as discussed above, where the low pressure de-aerated fluid mixes with the high velocity fluid from the nozzle 44.

As noted above, the above described system and components have various other applications. For example, in a front end loader having an energy recovery unit, the control valve could be connected to the high pressure supply line supplying hydraulic fluid to a lift cylinder or the valve could be connected to the return line of the lift cylinder when the return line is at high pressure for supplying energy to the energy recovery component, such as an accumulator or a generator.

Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A de-aeration device including:
    a jet pump configured to receive fluid to be de-aerated, wherein the jet pump includes a nozzle and a diffuser downstream of the nozzle, wherein the nozzle produces a high pressure stream of fluid that is delivered to an inlet of the diffuser;
    a suction chamber in fluidic communication with the jet pump, wherein fluid flowing through the jet pump generates a relatively low pressure in the suction chamber;
    a return chamber for receiving the fluid exiting the jet pump, wherein the return chamber receives a mixture of high pressure fluid flowing through the jet pump from a control valve and low pressure fluid drawn into the jet pump from the suction chamber; and
    a de-aeration chamber having a first end coupled to the return chamber and a second end coupled to the suction chamber, wherein the de-aeration chamber is configured to receive at least a portion of the mixture of fluid from the return chamber, separate gas from the mixture of fluid, and deliver the de-aerated fluid to the suction chamber.

2. A de-aeration device according to claim 1, wherein the diffuser is configured to receive the low pressure fluid drawn from the suction chamber and mix the low pressure fluid with the high pressure stream into the mixture of fluid delivered to the return chamber.

3. A de-aeration device according to claim 1, wherein the return chamber includes an inlet connected to an outlet of the diffuser and a first outlet associated with a port for connection to a reservoir.

4. A de-aeration device according to claim 3, wherein the return chamber additionally includes a second outlet connected to an inlet section of the de-aeration chamber by a passage.

5. A de-aeration device according to claim 4, wherein the passage includes flow restrictor configured to reduce the pressure of the fluid flowing from the return chamber to the de-aeration chamber.

6. A de-aeration device according to claim 1, wherein the de-aeration chamber includes an inlet for receiving the mixture of fluid, a gas outlet for expelling the gas from the de-aeration chamber and a fluid outlet for delivering the fluid to the suction chamber.

7. A de-aeration device according to claim 6, further including an flow restrictor disposed between the fluid outlet of the de-aeration chamber and an inlet of the suction chamber, wherein the flow restrictor is configured to maintain positive pressure in the de-aeration chamber relative to the suction chamber.

8. A de-aeration device according to claim 1, wherein the de-aeration chamber, in use, has a pressure lower than a pressure in the return chamber, and wherein the mixture of fluid received in the de-aeration chamber is, in use, drawn into the de-aeration chamber due to a pressure differential between the return chamber and the de-aeration chamber.

9. A de-aeration device according to claim 1, wherein the de-aeration chamber has a cyclone portion and the inlet of the de-aeration chamber is tangential to the walls of the chamber.

10. A de-aeration device according to claim 9, wherein the inlet of the de-aeration chamber is oriented to direct flow from the return chamber into the de-aeration chamber in a tangential manner to form a vortex inside the de-aeration chamber.

11. The de-aeration device of claim 1, in combination with a bleed valve configured to release the gas from the de-aeration device.

12. The de-aeration valve of claim 1, in combination with a control valve, wherein the control valve controllably supplies the high pressure hydraulic fluid from a high pressure supply line to the de-aeration device.

13. The combination according to claim 12, further comprising a controller for controlling the control valve such that the high pressure hydraulic fluid from the supply line is supplied to the de-aeration device in response to one or more sensed parameters.

14. A hydraulic system including:
a high pressure supply line for supplying high pressure hydraulic fluid to a hydraulic component;
a de-aeration device including:
  a jet pump configured to receive fluid to be de-aerated, wherein the jet pump includes a nozzle and a diffuser downstream of the nozzle, wherein the nozzle produces a high pressure stream of fluid that is delivered to an inlet of the diffuser;
  a suction chamber in fluidic communication with the jet pump, wherein fluid flowing through the jet pump generates a relatively low pressure in the suction chamber;
  a return chamber for receiving the fluid exiting the jet pump, wherein the return chamber receives a mixture of high pressure fluid flowing through the jet pump from a control valve and low pressure fluid drawn into the jet pump from the suction chamber; and
  a de-aeration chamber having a first end coupled to the return chamber and a second end coupled to the suction chamber, wherein the de-aeration chamber is configured to receive at least a portion of the mixture of fluid from the return chamber, separate gas from the mixture of fluid, and deliver the de-aerated fluid to the suction chamber;
a control valve for controllably supplying a portion of the high pressure hydraulic fluid from the high pressure supply line to the de-aeration device; and
a controller for controlling the control valve such that the high pressure hydraulic fluid from the supply line is supplied to the de-aeration device in response to one or more sensed parameters.

15. A hydraulic system according to claim 14, wherein the high pressure hydraulic fluid from the supply line is supplied to the de-aeration device in response to one or more sensed parameters indicative of non-critical periods of use of the hydraulic component.

16. A hydraulic system according to claim 14, further including at least one sensor configured to sense the one or more sensed parameters.

17. A hydraulic system according to claim 14, further including a bleed valve, wherein the bleed valve is configured to sense the presence of air in the de-aeration device and release the air from the de-aeration device.

18. A method of de-aerating hydraulic fluid flowing through high pressure supply lines to one or more hydraulic components, the supply lines configured to supply a relatively high volume of hydraulic fluid to the one or more hydraulic components, the method including:
sensing one or more parameters indicative of non-critical periods of use of the one or more hydraulic components;
controllably delivering at least a portion of the high pressure fluid from the supply line the to the jet pump of the de-aeration device according to claim 1 such that a relatively low volume of high pressure fluid is controllably supplied to the de-aeration device in response to the one or more parameters;
de-aerating the fluid in the de-aeration chamber of the de-aeration device in response to one or more sensed parameters; and
expelling gas that has been de-aerated from the fluid from the de-aeration device.

19. The method according to claim 18, further including:
sensing the presence of gas in the de-aeration device; and
expelling the gas that has been sensed from the de-aeration device.

20. The method according to claim 18, wherein the sensing of the one or more parameters is performed by at least one sensor, and wherein the supplying of the hydraulic fluid is performed by a control valve controlled by a controller.

* * * * *